US009684660B2

(12) United States Patent
Chen et al.

(10) Patent No.: US 9,684,660 B2
(45) Date of Patent: Jun. 20, 2017

(54) FILE PROCESSING METHOD AND SYSTEM

(71) Applicant: TENCENT TECHNOLOGY (SHENZHEN) COMPANY LIMITED, Shenzhen (CN)

(72) Inventors: Zhuo Chen, Shenzhen (CN); Zipan Bai, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 466 days.

(21) Appl. No.: 14/105,206

(22) Filed: Dec. 13, 2013

(65) Prior Publication Data

US 2014/0108472 A1 Apr. 17, 2014

Related U.S. Application Data

(63) Continuation of application No. PCT/CN2013/071199, filed on Jan. 31, 2013.

(30) Foreign Application Priority Data

Feb. 7, 2012 (CN) .......................... 2012 1 0025896

(51) Int. Cl.
*G06F 17/30* (2006.01)
*G06F 7/00* (2006.01)

(52) U.S. Cl.
CPC .. *G06F 17/30091* (2013.01); *G06F 17/30144* (2013.01)

(58) Field of Classification Search
CPC ................. G06F 17/30091; G06F 17/30144
See application file for complete search history.

(56) References Cited

U.S. PATENT DOCUMENTS 6,308,243 B1 * 10/2001 Kido ..................... G06F 9/526
 711/147
7,480,749 B1 * 1/2009 Danilak ............... G06F 3/0656
 710/52
(Continued)

FOREIGN PATENT DOCUMENTS

CN 1624669 A 6/2005
CN 1655130 A 8/2005
(Continued)

OTHER PUBLICATIONS

The World Intellectual Property Organization (WIPO) International Search Report for PCT/CN2013/071199 May 2, 2013.
(Continued)

*Primary Examiner* — Jeffrey A Burke
(74) *Attorney, Agent, or Firm* — Anova Law Group, PLLC

(57) ABSTRACT

Various embodiments provide a file processing method and system. An exemplary file processing method can include receiving a request for opening a file, applying for a memory area corresponding to the file requested for opening and setting a property of the memory area as non-readable and non-writable. After receiving a request for reading the file, the memory area corresponding to the file requested for reading can be accessed. If the accessing fails for a failure reason that the property of the memory area is non-readable and non-writable, file data requested for reading can be obtained from a disk by calling a memory access exception handler function registered in an operating system. The obtained file data can be stored in the memory area. The property of the memory area can be set as readable and writable and the file data can be read from the memory area.

19 Claims, 3 Drawing Sheets

(56) References Cited

U.S. PATENT DOCUMENTS

| | | | |
|---|---|---|---|
| 7,577,962 B2* | 8/2009 | Bendapudi | G06F 9/4812 712/244 |
| 8,195,878 B2* | 6/2012 | Mittendorff | G06F 12/0866 711/100 |
| 8,370,452 B2* | 2/2013 | Harvell | G06F 15/167 709/203 |
| 8,395,632 B2* | 3/2013 | Misra | G06F 9/30025 345/541 |
| 8,719,661 B1* | 5/2014 | Gulati | G06F 11/1412 714/764 |
| 2011/0225343 A1 | 9/2011 | Takeuchi | |
| 2012/0016847 A1* | 1/2012 | Provencher | G06F 17/30067 707/693 |
| 2015/0100570 A1* | 4/2015 | Zent | G06F 17/3053 707/723 |
| 2015/0113222 A1* | 4/2015 | Naik | G06F 12/0808 711/133 |

FOREIGN PATENT DOCUMENTS

| | | |
|---|---|---|
| CN | 101075241 A | 11/2007 |
| CN | 201707662 U | 1/2011 |

OTHER PUBLICATIONS

The State Intellectual Property Office of the People's Republic of China (SIPO) Office Action 1 for 201210025896.X May 6, 2015.

* cited by examiner

FILE PROCESSING METHOD AND SYSTEM

CROSS-REFERENCES TO RELATED APPLICATIONS

This application is a continuation application of PCT Patent Application No. PCT/CN2013/071199, filed on Jan. 31, 2013, which claims priority to Chinese Patent Application No. CN201210025896.X, filed on Feb. 7, 2012, the entire contents of both of which are incorporated herein by reference.

FIELD OF THE DISCLOSURE

The present disclosure relates to the field of file processing technology and, more particularly, relates to a file processing method and system.

BACKGROUND

Windows API (i.e., application programming interface) is a predefined Windows function used to control appearance and behavior of various components in Windows operating system. Via the Windows API functions, the Windows operating system may be informed of operations from a user. All application software programs in the Windows operating system may call the Windows API functions.

Currently, the Windows operating system locates data-to-be-read by calling set file pointer (SetFilePointer) function and then reads the file by calling read file (ReadFile) function. When frequently reading a file, the Windows operating system has to frequently call the SetFilePointer function to have the file pointer point to an area of the file to be read, and then call the ReadFile function to read the data in this area. Each data reading requires a track seeking operation on the disk and, each time, a disk IO (i.e., input/output) is generated. Consequently, the speed of reading a file is adversely reduced.

Thus, there is a need to provide a file processing method and system to overcome these and other problems.

BRIEF SUMMARY OF THE DISCLOSURE

Various embodiments provide a file processing method and system to reduce frequent generations of disk IO when reading files and to save system resources.

According to various embodiments, there is provided a file processing method based on an operating system, by registering a memory access exception handler function with the operating system, receiving a request for opening a file, applying for a memory area corresponding to a file requested for opening, and setting a property of the memory area as non-readable and non-writable. After receiving a request for reading the file, the memory area can be accessed. If the accessing fails because the property of the memory area is non-readable and non-writable, file data requested for reading can be obtained from a disk by calling a memory access exception handler function registered in the operating system. The obtained file data can be stored in the memory area. The property of the memory area can be set as readable and writable and the file data can be read from the memory area.

According to various embodiments, there is also provided a file processing system including a receiving module, a first processing module, a second processing module, and an obtaining module. The receiving module can be configured to receive a request for opening a file and to receive a request for reading the file. The first processing module can be configured to apply for a memory area corresponding to the file requested for opening and to set a property of the memory area as non-readable and non-writable, when the receiving module receives the request for opening the file. The second processing module can be configured to access the memory area, when the receiving module receives the request for reading the file and to obtain file data requested for reading from a disk by calling a memory access exception handler function registered in the operating system. The second processing module can further be configured, if access to the memory area fails because the property of the memory area is non-readable and non-writable, to store the obtained file data in the memory area and to set the property of the memory area as readable and writable. The obtaining module can be configured to read the file data from the memory area.

According to various embodiments, there is provided a non-transitory computer-readable medium having computer program. When being executed by a processor, the computer program performs a file processing method based on an operating system, by registering a memory access exception handler function with the operating system, receiving a request for opening a file, applying for a memory area corresponding to a file requested for opening, and setting a property of the memory area as non-readable and non-writable. After receiving a request for reading the file, the memory area can be accessed. If the accessing fails because the property of the memory area is non-readable and non-writable, file data requested for reading can be obtained from a disk by calling a memory access exception handler function registered in the operating system. The obtained file data can be stored in the memory area. The property of the memory area can be set as readable and writable and the file data can be read from the memory area.

In a certain embodiment, the disclosed file processing method and system can include registering a memory access exception handler function in an operating system, applying for memory area corresponding to a file to be opened, and reading file data from the memory area. If the memory access fails because the memory area property is non-readable and non-writable, the file data requested for reading can be obtained from a disk by calling and executing the memory access exception handler function. As disclosed, when file data from a same certain area are read, disk IO can be generated only when the file data are read for the first time. The file data can then be stored in a memory area. If thereafter the file data need to be read again from the same certain area, the file data can be read directly from the memory area. No disk IO can be generated again. System resources can be saved to improve efficiency for reading files.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Various embodiments provide a file processing method and system to reduce frequent disk IO when reading files and to save system resources. In one embodiment, the disclosed file processing method and system and/or other suitable systems/programs (such as an operating system) may run on, e.g., a computer or any suitable devices having a computer system (such as a mobile terminal device).

Figure 4:
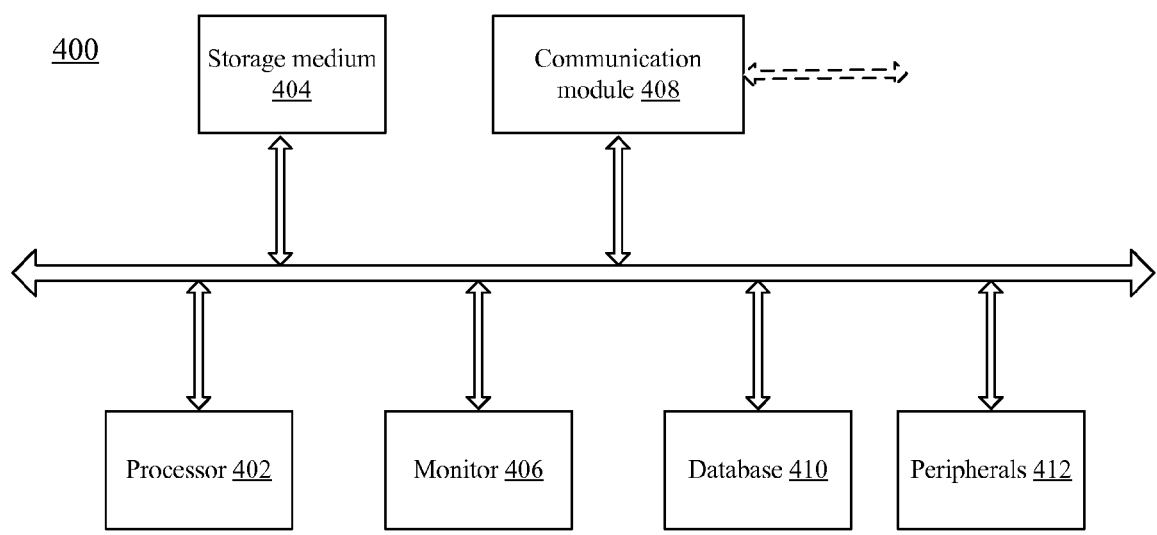
FIG. 4 depicts an exemplary computer system in accordance with various disclosed embodiments.

FIG. 4 depicts an exemplary computer system 400 capable of implementing the disclosed file processing method and system. As shown in FIG. 4, computer system 400 may include a processor 402, a storage medium 404, a monitor 406, a communication module 408, a database 410, and peripherals 412. Certain devices may be omitted and other devices may be further included.

Processor 402 may include any appropriate processor or processors. Further, processor 402 can include multiple cores for multi-thread or parallel processing. Storage medium 404 may include memory modules, such as ROM, RAM, and flash memory modules, and mass storages, such as CD-ROM, U-disk, hard disk, etc. Storage medium 404 may store any suitable computer programs for implementing various processes, when executed by processor 402.

Further, peripherals 412 may include I/O devices such as keyboard and mouse, and communication module 408 may include network devices for establishing connections through a wireless or wired communication network. Database 410 may include one or more databases for storing certain data and for performing certain operations on the stored data, such as database searching.

In various embodiments, the computer system depicted in FIG. 4 can be used or adapted for implementing the file processing method and system along with other suitable systems/programs. For example, in one embodiment, an exception handling mechanism can be used in the disclosed file processing method/system to store file data in a memory area to achieve quick file read.

As used herein, an exception handling mechanism is referred to a mechanism including, for example, predefining a memory access exception handler function and registering the predefined memory access exception handler function in an operating system. When an access to memory by a user is abnormal, the operating system does not follow system routine processing (e.g., to generate warning information, etc.). Instead, the operating system can call the exception handler function to process such abnormality. For example, when opening a file, a corresponding memory area is requested. When reading file data, corresponding data are read from the memory area. If the memory data do not exist, a memory access exception (e.g., missing page) may occur, i.e., the file data are read for the first time. The file processing system can call the exception handler function, and the exception handler function can call the SetFilePointer function and ReadFile function to store file data in the memory area. If the memory data do exist, meaning the file data have been already read once, the file data can then be read directly from the memory area.

Figure 1:
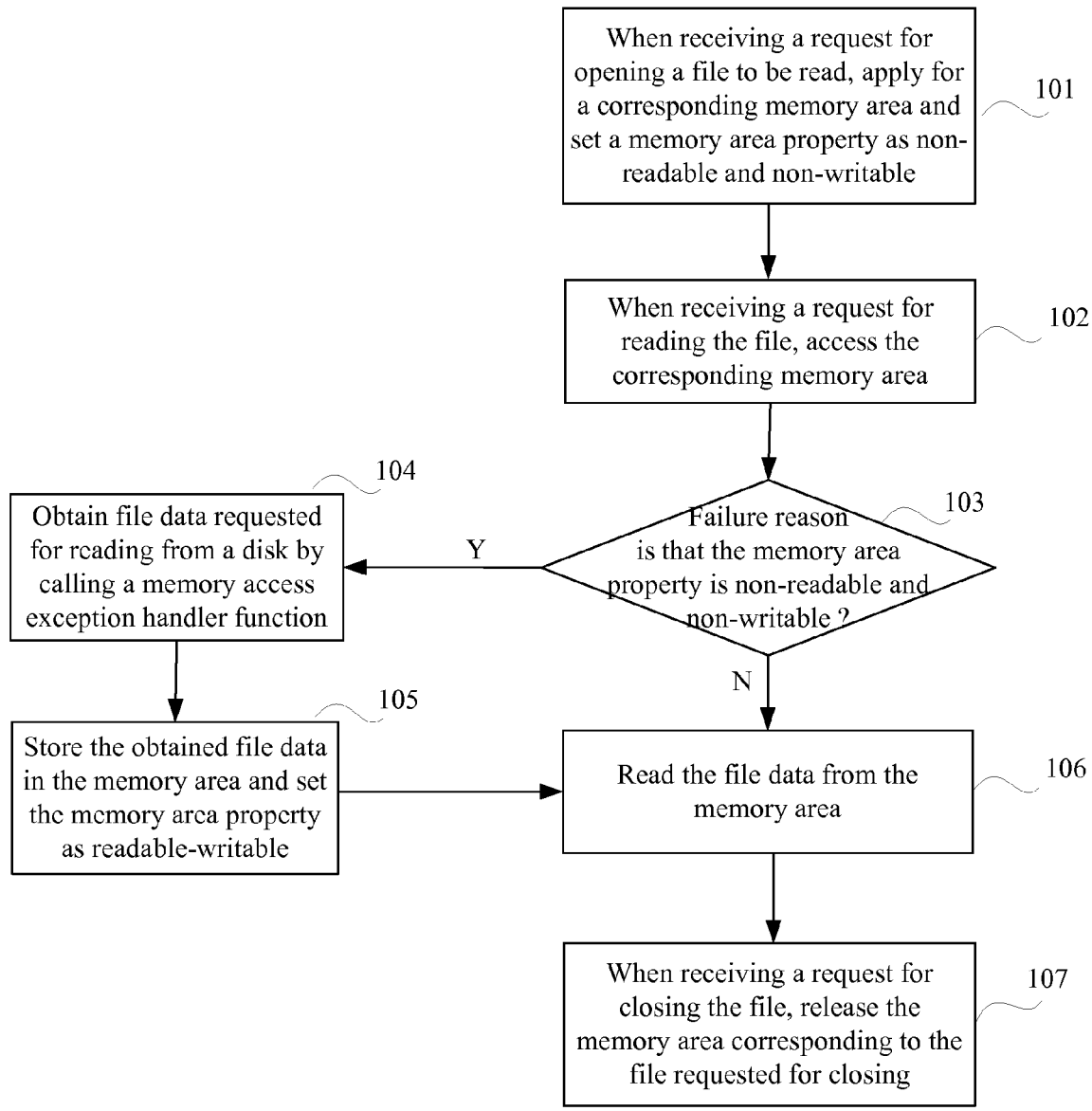
FIG. 1 depicts an exemplary file processing method in accordance with various disclosed embodiments.

FIG. 1 depicts an exemplary file reading method having a memory access exception handler function registered in an operating system.

As shown in FIG. 1, in Block 101, when receiving a request for opening a file to be read, the file processing system can apply for a memory area corresponding to the file requested for opening. The file processing system can also set a memory area property as non-readable and non-writable. The memory area can have a size no less than the file requested for opening. In one emobodiment, the size of the memory area is equal to the size of the file.

In various embodiments, the file processing system can apply for the memory area by calling VirtualAlloc function. The VirtualAlloc function is a Windows API function and is contained in a windows system file Kernel32.dll. The VirtualAlloc function is functioned to call process virtual address space and to schedule or submit a portion of page(s). The VirtualAlloc function is used for memory allocation. The VirtualAlloc function may use multiple calls in parallel to submit a part or a whole of an area and to retain one large memory area. Multiple call submission of a same area does not cause failure, which allows an application, after reserving the memory, to freely submit the page to be written.

In Block 102, when a request for reading the file is received, the memory area corresponding to the file requested for reading can be accessed. In Block 103, if the memory access fails and a failure reason is that the memory area property is non-readable and non-writable, Block 104 can be performed. Otherwise, if the memory access does not fail or the failure reason is not that the memory area property is non-readable and non-writable, Block 106 can be performed.

When a user reads the file, the file processing system can read file data from a corresponding memory area. If this is the first time to read the file, the memory area property can be "non-readable and non-writable" as originally set. Memory access exception can be generated and memory access exception handler function can be called. Block 104 can then be performed. In this case, the file is stored on the disk and has not yet been saved to the memory area.

If the user has previously read the file (i.e., not the first time to read the file) and the memory area property has been modified to be "readable and writable", memory access exception can not be generated. In this case, the file data have already been stored in the memory area. Block 106 can then be directly performed.

Figure 2:
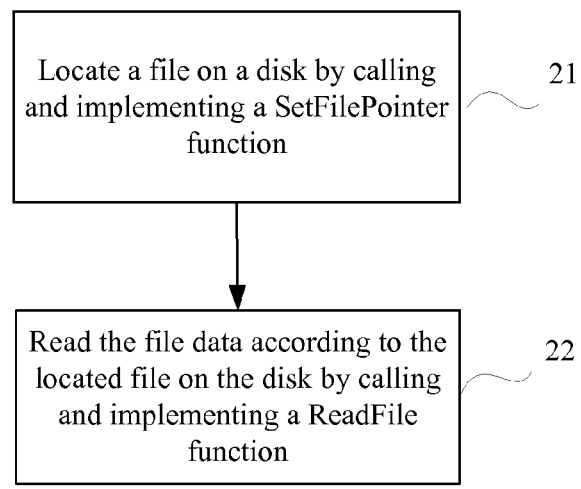
FIG. 2 depicts an exemplary file processing method by calling a memory access exception handler function in accordance with various disclosed embodiments.

In Block 104, the file processing system can call the memory access exception handler function to obtain from the disk the file data requested to be read. The memory access exception handler function can include a set file pointer (SetFilePointer) function and a read file (ReadFile) function. Calling the memory access exception handler function to read file data from the disk may generate a disk IO. FIG. 2 depicts an exemplary method for calling memory access exception handler function to read file data from a disk in accordance with various disclosed embodiments.

In Block 21, the file processing system can call and execute SetFilePointer function to locate the file in the disk. Specifically, pointers can record location of the file, i.e., the pointer function can locate the file as on which sector, track, cluster, and byte of the disk to accurately find storage location of the file on the disk.

In Block 22, the file processing system can call and execute ReadFile function to read the file data according to the location of the file on the disk. For example, when SetFilePointer function navigates to the location of the file on the disk, the file processing system can record the location information of a current file and read file data by calling the ReadFile function. The ReadFile function often includes four parameters which are used to respectively indicate: file to be read, buffer for saving read file data, length of the file to be read, and the actual read file size. For example, the SetFilePointer function can locate a file on a disk on a third sector, a second track, a second cluster, and a third byte. That means, when ReadFile function is called to read this file, this file can be read starting from the third byte and data with specified length can be placed into a specified buffer.

In one embodiment, a request for reading a file may be a request for reading partial file data. By calling and executing the memory access exception handler function, file data obtained from the disk can be partial file data requested for reading. Specifically, when receiving a user's request for reading data in a certain area of the file (e.g., to read only a certain page of file data), the file processing system may not access the entire memory area, but access a certain memory area corresponding to the data in the certain area of the file (e.g., a memory area corresponding to the file data of that certain page).

If a memory area property corresponding to the data in the certain area of the file, e.g., file data of that certain page, is non-readable and non-writable, file data of that certain page can be obtained from the disk by calling and executing the memory access exception handler function (e.g., including the SetFilePointer function and ReadFile function). The file data of that certain page can be stored in a corresponding memory area. The corresponding memory area property can be set readable and writable. The file data of that certain page can be read from the corresponding memory area. If the corresponding memory area has a property as readable and writable, meaning the file data of that certain page is not read for the first time, the file data of that certain page can be read directly from the corresponding memory area.

In various embodiments, partial file data that needs to be read can be defined as needed, e.g., by a user, in a ReadFile function. The partial file data can be stored in the memory area without having to read the entire file data. Memory area over-usage and unnecessary waste of system resources can be avoided.

In Block 105, the file processing system can store file data in the corresponding memory area and can modify the memory area property to be readable and writable. After the file processing system finishes the storing operation of the file data in the memory area, the memory area property can be modified as readable and writable, which is originally set as non-readable and non-writable. When the file is subsequently read again, the file can be read directly from the memory area and disk IO can be avoided.

In Block 106, the file processing system can read the file data from the memory area. In Block 107, when receiving a request for closing the file, the file processing system can release the memory area corresponding to the file requested to be closed.

In this manner, the disclosed file processing method and system can include, for example, registering a memory access exception handler function in an operating system, applying for memory area corresponding to a file to be opened, and reading file data from the memory area. If the memory access fails and a failure reason is that the memory area property is non-readable and non-writable, the file data requested for reading can be obtained from a disk by calling and executing the memory access exception handler function.

As disclosed, when file data from a same certain area are read, disk IO can be generated only when the file data are read for the first time. The file data can then be stored in a memory area. If thereafter the file data need to be read again from the same certain area, the file data can be read directly from the memory area. No disk IO can be generated again. System resources can be saved to improve efficiency for reading files.

Figure 3:
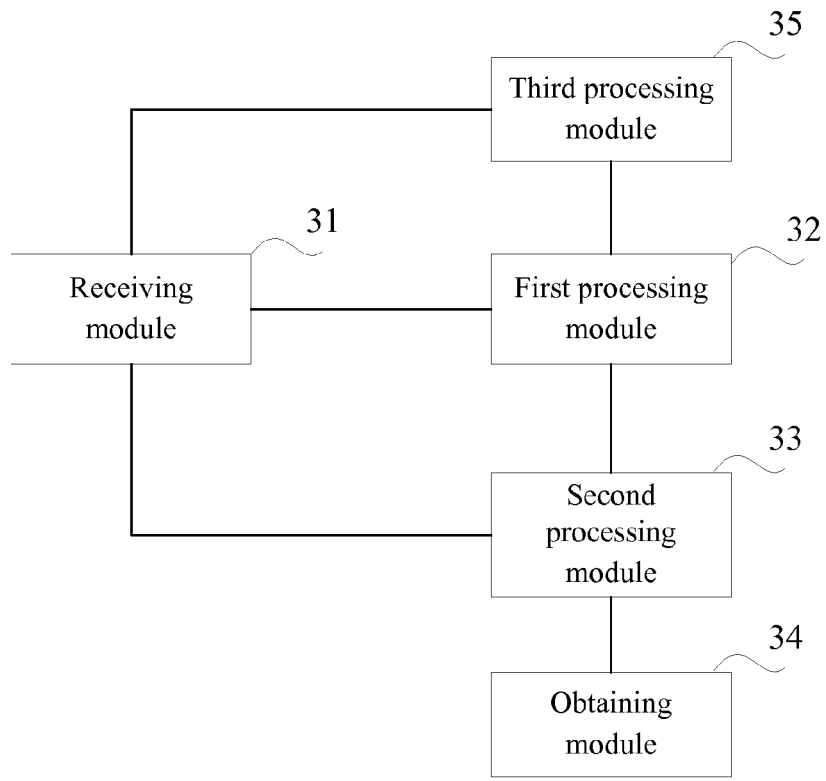
FIG. 3 depicts an exemplary file processing system in accordance with various disclosed embodiments.

FIG. 3 depicts a file processing system having a memory access exception handler function registered in an operating system. As shown in FIG. 3, the exemplary system can include a receiving module 31, a first processing module 32, a second processing module 33, and/or an obtaining module 34.

The receiving module 31 can be configured to receive a request for opening a file and to receive a request for reading the file. When the receiving module 31 receives the request for opening the file, the first processing module 32 can be configured to apply for a memory area corresponding to the file requested for opening and to set a memory area property as non-readable and non-writable.

When the receiving module 31 receives the request for reading the file, the second processing module 33 can be configured to access the memory area corresponding to the file requested for reading. If the memory access fails and the reason for failure is that the memory area property is non-readable and non-writable, the file data requested for reading can be obtained from a disk by calling and executing the memory access exception handler function. The obtained file data can then be stored in the memory area and memory area property can be set as readable and writable. The file data can be read from the memory area by calling the obtaining module 34. Otherwise, if the memory access does not fail or the failure reason is not that the memory area property is non-readable and non-writable, the obtaining module 34 can be called to read the file data directly from the memory area.

The obtaining module 34 can read the file data from the memory area. Specifically, the memory access exception handler function can include SetFilePointer and the ReadFile functions. The second processing module 33 can be used to locate the file on the disk by calling and executing the SetFilePointer function; and to read the file data according to the location of the file on the disk by calling and executing the ReadFile function.

In one embodiment, the request for reading the file can be a request for reading partial file data. The second processing module 33 can be used to call and implement the memory access exception handler function to obtain partial file data requested for reading from the disk.

In one embodiment, when the receiving module 31 receives a request for opening a file, the first processing module 32 can be used to apply for a memory area having a size no less than the file size, and to establish a corresponding relationship between the memory area and the file.

Optionally, the file processing system can further include a third processing module 35. In this case, the receiving module 31 can be used to receive a request for closing the file. When the receiving module 31 receives the request for closing the file, the third processing module 35 can be used to release the memory area corresponding to the file requested for closing.

In various embodiments, the disclosed modules can be configured in one apparatus or configured in multiple apparatus as desired. The modules disclosed herein can be integrated in one module or in multiple modules. Each of the modules disclosed herein can be divided into one or more sub-modules, which can be recombined in any manner.

The disclosed embodiments (e.g., as shown in FIGS. 1-4) are examples only. One of ordinary skill in the art would appreciate that suitable software and/or hardware (e.g., a universal hardware platform) may be included and used in accordance with various disclosed embodiments. For example, the disclosed embodiments can be implemented by hardware only, which alternatively can be implemented by software products only. The software products can be stored in a storage medium. The software products can include suitable commands to enable a terminal device (e.g., including a mobile phone, a personal computer, a server, or a network device, etc.) to implement the disclosed embodiments.

Other applications, advantages, alternations, modifications, or equivalents to the disclosed embodiments are obvious to those skilled in the art.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The disclosed file processing method and system can include, for example, registering a memory access exception handler function in an operating system, applying for memory area corresponding to a file to be opened, and reading file data from the memory area. If the memory access fails and a failure reason is that the memory area property is non-readable and non-writable, the file data requested for reading can be obtained from a disk by calling and executing the memory access exception handler function. As disclosed, when file data from a same certain area are read, disk 10 can be generated only when the file data are read for the first time. The file data can then be stored in a memory area. If thereafter the file data need to be read again from the same certain area, the file data can be read directly from the memory area. No disk IO can be generated again. System resources can be saved to improve efficiency for reading files.

What is claimed is:

1. A file processing method based on an operating system, comprising:
   receiving a request for opening a file, the file being stored in a disk;
   applying for a memory area corresponding to the file requested for opening;
   in response to the request for opening the file, when the applied memory area is assigned to the file, setting a property of the memory area as non-readable and non-writable;
   receiving a request for reading the file;
   in response to the request for reading the file, accessing the memory area corresponding to the file;
   when the accessing of the memory area for reading the file fails because the property of the memory area is non-readable and non-writable, calling a memory access exception handler function registered with the operating system to initiate the following operations:
   obtaining file data requested for reading from the disk, storing the obtained file data in the memory area, and setting the property of the memory area as readable and writable; and
   reading the file data from the memory area.

2. The method of claim 1, wherein the memory access exception handler function includes a set file pointer (SetFilePointer) function and a read file (ReadFile) function, and wherein obtaining the file data by calling the memory access exception handler function includes:
   locating the file on the disk by calling and executing the SetFilePointer function; and
   reading the file data according to the located file on the disk by calling and executing the ReadFile function.

3. The method of claim 1, wherein the request for reading the file is a request for reading partial file data and wherein, by calling and executing the memory access exception handler function, the file data obtained from the disk are the partial file data requested for reading.

4. The method of claim 1, wherein applying for the memory area corresponding to the file requested for opening includes:
   applying for the memory area having a size no less than the file; and
   establishing a corresponding relationship between the memory area and the file.

5. The method of claim 1, further including:
   receiving a request for closing the file, and
   releasing the memory area.

6. The file processing method according to claim 1, wherein:
   when an access to a memory area of the operating system is abnormal, the operating system triggers the registered memory access exception handler function instead of following a system routine processing procedure for abnormal activity.

7. The file processing method according to claim 3, wherein:
   by calling and executing the memory access exception handler function, the property of a partial memory area corresponding to the partial file data obtained from the disk is set as readable and writable; and the property of a remaining memory area other than the partial memory area is unchanged.

8. The file processing method according to claim 1, wherein:
   after the file is opened, data of the file is only read from the disk once when the data is requested for a first time, and after the first time, the data of the file is read from the assigned memory area.

9. The file processing method according to claim 1, wherein applying for the memory area further comprises:
   calling a VirtualAlloc function in a windows system, the VirtualAlloc function being configured to use multiple calls in parallel for memory allocation; and
   allocating the memory area corresponding to the file by the VirtualAlloc function.

10. A file processing system based on an operating system, comprising at least a processor, a disk, a memory, and a plurality of program modules to be executed by the processor, the plurality of program modules comprising:
   a receiving module configured to receive a request for opening a file and to receive a request for reading the file, the file being stored in the disk;
   a first processing module configured, when the receiving module receives the request for opening the file, to apply for a memory area corresponding to the file requested for opening; and in response to the request for opening the file, when the applied memory area is assigned to the file, to set a property of the memory area as non-readable and non-writable;

a second processing module configured, when the receiving module receives the request for reading the file, to access the memory area corresponding to the file; and if access to the memory area for reading the file fails because the property of the memory area is non-readable and non-writable, to call a memory access exception handler function registered with the operating system to initiate the following operations: calling file data requested for reading from the disk, storing the obtained file data in the memory area, and setting the property of the memory area as readable and writable; and an obtaining module configured to read the file data from the memory area.

11. The system of claim 10, wherein the memory access exception handler function includes a set file pointer (SetFilePointer) function and a read file (ReadFile) function and wherein the second processing module is configured:

to locate the file on the disk by calling and executing the SetFilePointer function; and to read the file data according to the located file on the disk by calling and executing the ReadFile function.

12. The system of claim 10, wherein the request for reading the file is a request for reading partial file data, and wherein the second processing module is configured such that, by calling and executing the memory access exception handler function, the file data obtained from the disk are the partial file data requested for reading.

13. The system of claim 10, wherein the first processing module is configured, when the receiving module receives the request for opening the file, to apply for the memory area having a size no less than the file, and to establish a corresponding relationship between the memory area and the file.

14. The system of claim 10, further including a third processing module, wherein the receiving module is configured to receive a request for closing the file and the third processing module is configured to release the memory area.

15. A non-transitory computer-readable medium having computer program for, when being executed by a processor, performing a file processing method based on an operating system, the method comprising:

receiving a request for opening a file, the file being stored in a disk;

applying for a memory area corresponding to the file requested for opening;

in response to the request for opening the file, when the applied memory area is assigned to the file, setting a property of the memory area as non-readable and non-writable;

receiving a request for reading the file;

in response to the request for reading the file, accessing the memory area corresponding to the file;

when the accessing of the memory area for reading the file fails because the property of the memory area is non-readable and non-writable, calling a memory access exception handler function registered with the operating system to initiate the following operations: obtaining file data requested for reading from the disk, storing the obtained file data in the memory area, and setting the property of the memory area as readable and writable; and reading the file data from the memory area.

16. The computer-readable medium of claim 15, wherein the memory access exception handler function includes a set file pointer (SetFilePointer) function and a read file (ReadFile) function, and wherein obtaining the file data by calling the memory access exception handler function includes:

locating the file on the disk by calling and executing the SetFilePointer function; and reading the file data according to the located file on the disk by calling and executing the ReadFile function.

17. The computer-readable medium of claim 15, wherein the request for reading the file is a request for reading partial file data and wherein, by calling and executing the memory access exception handler function, the file data obtained from the disk are the partial file data requested for reading.

18. The computer-readable medium of claim 15, wherein applying for the memory area corresponding to the file requested for opening includes:

applying for the memory area having a size no less than the file; and establishing a corresponding relationship between the memory area and the file.

19. The computer-readable medium of claim 15, wherein the method further includes:

receiving a request for closing the file, and releasing the memory area.

* * * * *